Patented Sept. 14, 1943

2,329,365

UNITED STATES PATENT OFFICE 2,329,365

IRON BLUE PIGMENT

Paul A. Thomasset, St. George, Staten Island, N. Y., assignor to Ansbacher-Siegle Corporation, New York, N. Y., a corporation of New York No Drawing. Application December 17, 1941, Serial No. 423,313

4 Claims. (Cl. 106—304)

My present invention relates to the manufacture of colors of the general type known as "iron blues" including Prussian blue. More particularly, it concerns the manufacture of iron blues of a type having a high resistance to alkalies. These colors have a range of shades varying in accordance with steps practised in the process of production that are well known in the art and have a wide range of application in the printing ink, paint, lacquer, and pigment fields generally. However, iron blue pigments are very deleteriously affected by alkalies and as these colors are very frequently applied to uses where they come into contact with alkalies, they are frequently spoiled. For instance, when a soap wrapper is printed with Prussian blue, if sufficient moisture is present to dissolve the soap, the wrapper will be seriously marred and made unpresentable by reason of the fact that the ink will be changed from a rich deep blue color to a muddy yellow, and the whole appearance of the wrapper thus spoiled.

These colors are generally considered to be a precipitate of ferric ferrocyanide and formerly were made by precipitating potassium ferrocyanide by ferrous sulphate and then by oxidizing the bluish white precipitate thus formed to a darker blue, the commercial Prussian blue.

More recently, iron blues have been produced by precipitating sodium ferrocyanide with ferrous sulphate in the presence of ammonium sulphate and acid, usually sulphuric acid. The resulting precipitate is then oxidized by means of various oxidizing agents, such as sodium chlorate and sodium bichromate at a temperature of about 75° C., and the product is then filtered, washed free of soluble salts, and dried in the usual manner. The pigment so obtained is very satisfactory and in every respect the equal of if not superior to the potassium ferrocyanide product. It has, however, like all iron blues heretfore produced, a vary great susceptibility to the action of alkalies, and the color is very deleteriously affected if it comes into contact therewith.

It is a principal object of the present invention to provide an iron blue that will have a very high resistance to the action of alkalies, even such strong alkalies as caustic soda.

It may be said broadly that this result is obtained, according to the present invention, by taking such steps in the process of the manufacture of the iron blues as to reduce the oil absorption very considerably and by adding salts of certain metals of the iron group which have the effect of greatly increasing the resistance of the color to the action of alkalies.

The first result, namely, that of reducing the oil absorption of the pigment, is in the preferred process attained by adding an excess of sodium sulphate prior to the precipitation of the whitish precipitates. It is to be noted here that in the normal reaction of the ingredients that throw down this whitish precipitate, sodium sulphate is always formed because of the reaction of the sodium ferrocyanide with ferrous sulphate which yields ferrous ferrocyanide and sodium sulphate. However, it is contemplated, according to the process of this invention, to add free sodium sulphate to a solution of ferrous sulphate, ammonium sulphate, and sulphuric acid, all these ingredients being dissolved in water at a temperature of about 30° C. This addition of sodium sulphate is a departure from the usual formula of manufacture which normally results in the undesired and unavoidable production of a large amount of sodium sulphate due to the above described reaction which takes place upon the addition of sodium ferrocyanide in an aqueous solution at 30° C.

Upon the addition of the sodium ferrocyanide, precipitation takes place. The precipitate is raised to a temperature of 75° C. and salts of certain metals of the iron group, such as nickel sulphate or cobalt chloride, are added. The product resulting has a very high degree of resistance to the action of alkalies.

In my copending application Serial No. 304,547, now Patent No. 2,275,929, granted March 10, 1942, of which the present application is a continuation-in-part, I have disclosed a formula for carrying out the invention which calls for the addition of water-soluble nickel or cobalt salts, or mixtures of the two, to be added to accomplish the purpose of the invention. The present application, however, is limited to the use of the said mixtures of water-soluble nickel and cobalt salts.

A formula according to the present invention follows:

First, a solution in water at about 30° C. is made of 65½ k. of ferrous sulphate, 21.4 k. of ammonium sulphate, 15 k. of sodium sulphate, and 2.1 k. of 66 Baumé sulphuric acid in 500 liters of water. To this is added a solution of 100 k. of sodium ferrocyanide dissolved in 1000 liters of water at 30° C. which is added slowly with stirring. Upon precipitation, the temperature is increased to 75° C. and 3.5 k. of a mixture of nickel sulphate and cobalt chloride dissolved in 50 liters of water is added. The whole is stirred for a few minutes and an additional portion of 24.4 k. of sulphuric acid 66 Baumé is then added. Oxidation is then carried out by the addition of a solution of 5½ k. of sodium chlorate in 50 liters of hot water. The batch is then stirred for a few minutes, filtered, washed free of soluble salts, and dried in the usual manner.

The product obtained is apparently the oxidized reaction products of ferrous ferrocyanide and the nickel and cobalt salts which are soluble under the conditions of the process.

It is also the case that variations in the shade and strength and oil absorption of the pigment can be obtained by variations in temperature and in the concentrations of the ingredients.

Instead of nickel sulphate or cobalt chloride, other nickel salts or cobalt salts may be used, such as nickel ammonium sulphate and nickel chloride, and other water soluble nickel and cobalt salts which also give substantially the same high resistance to alkalies.

It is to be understood that certain nickel and cobalt salts, such as nickel hydroxide or cobalt hydroxide, which are insoluble salts by themselves, become soluble in the presence of sulphuric acid and may accordingly be used with the same effect as the nickel and cobalt salts above mentioned.

Sodium sulphate is, of course, a soluble salt and, regardless of whether it is produced by the reaction of the ferrous sulphate and sodium ferrocyanide or whether it is added in the free state, it is eliminated during the washing and drying step and does not appear in the ultimate product.

The process of this invention is, of course, not limited to iron blues produced by the sodium ferrocyanide process described above as a preferred process, but is applicable to the potassium ferrocyanide process referred to hereinabove and to other alkali ferrocyanide processes of making iron blues as well. But in any case, the process would be advantageously exemplified in that it calls for the reduction of oil absorption and the addition of salts of the iron group metals are hereinbefore described.

Having thus described my invention, what I claim is:

1. A process for making alkali resisting iron blues which comprises dissolving in water at about 30° C. ferrous sulphate, ammonium sulphate and sulphuric acid; adding thereto free sodium sulphate in aqueous solution; then reacting said solution with a solution of sodium ferrocyanide in water, thus forming a white precipitate; raising the temperature of the precipitate to about 75° C. and adding an aqueous solution of nickel sulphate and cobalt chloride to said precipitate and oxidizing the mass to a blue color by the addition of sulphuric acid and an aqueous solution of sodium chlorate.

2. An alkali resisting iron blue comprising the oxidized reaction products of ferrous ferrocyanide, an aqueous solution of nickel and cobalt salts and sulphuric acid.

3. An alkali resisting iron blue comprising the reaction products resulting from the addition of an aqueous solution of salts of nickel and cobalt to a precipitate formed by the reaction of an aqueous solution of sodium ferrocyanide with a solution of ferrous sulphate, ammonium sulphate and sulphuric acid; said reaction products being oxidized to a blue color.

4. An alkali resisting iron blue comprising the oxidized reaction products resulting from the addition of salts of nickel and cobalt that become water soluble in the presence of sulphuric acid, to a precipitate formed by the addition of sodium ferrocyanide to an aqueous solution of ferrous sulphate, ammonium sulphate, sodium sulphate and sulphuric acid.

PAUL A. THOMASSET.